(12) United States Patent
Bigioi et al.

(10) Patent No.: US 9,025,837 B2
(45) Date of Patent: May 5, 2015

(54) IMAGE PROCESSING METHOD AND APPARATUS

(71) Applicant: DigitalOptics Corporation Europe Limited, Galway (IE)

(72) Inventors: Petronel Bigioi, Galway (IE); Peter Corcoran, Claregalway (IE); Eran Steinberg, San Francisco, CA (US)

(73) Assignee: Fotonation Limited, Ballybrit, Galway (IE)

( * ) Notice: Subject to any disclaimer, the term of this patent is extended or adjusted under 35 U.S.C. 154(b) by 0 days.

(21) Appl. No.: 13/947,095

(22) Filed: Jul. 21, 2013

(65) Prior Publication Data

US 2013/0301917 A1    Nov. 14, 2013

Related U.S. Application Data

(63) Continuation of application No. 13/103,077, filed on May 8, 2011, now Pat. No. 8,515,138, which is a continuation of application No. 13/034,707, filed on Feb. 25, 2011, now Pat. No. 8,494,232, which is a continuation of application No. 11/752,925, filed on May 24, 2007, now Pat. No. 7,916,971.

(51) Int. Cl.
*G06K 9/00* (2006.01)
*G06K 9/62* (2006.01)
*G03B 19/02* (2006.01)

(52) U.S. Cl.
CPC ............ *G06K 9/6202* (2013.01); *G03B 19/02* (2013.01); *G06K 9/00288* (2013.01); *G06K 9/6255* (2013.01)

(58) Field of Classification Search
USPC .................................................. 382/115–118
See application file for complete search history.

(56) References Cited

U.S. PATENT DOCUMENTS

| | | | |
|---|---|---|---|
| 6,633,655 | B1 | 10/2003 | Hong et al. |
| 7,787,664 | B2 | 8/2010 | Luo et al. |
| 7,916,971 | B2 | 3/2011 | Bigioi et al. |
| 2004/0223649 | A1 | 11/2004 | Zacks et al. |

(Continued)

FOREIGN PATENT DOCUMENTS

| | | |
|---|---|---|
| JP | 09-212620 A | 8/1997 |
| JP | 2007-087234 A | 4/2007 |

OTHER PUBLICATIONS

Patent Abstracts of Japan, publication No. 09-212620, publication date: Aug. 15, 1997, for: Manufacture of Face Image.

(Continued)

*Primary Examiner* — Wesley Tucker
(74) *Attorney, Agent, or Firm* — Hickman Palermo Becker Bingham LLP (57) ABSTRACT

An image processing technique includes acquiring a main image of a scene and determining one or more facial regions in the main image. The facial regions are analyzed to determine if any of the facial regions includes a defect. A sequence of relatively low resolution images nominally of the same scene is also acquired. One or more sets of low resolution facial regions in the sequence of low resolution images are determined and analyzed for defects. Defect free facial regions of a set are combined to provide a high quality defect free facial region. At least a portion of any defective facial regions of the main image are corrected with image information from a corresponding high quality defect free facial region.

28 Claims, 4 Drawing Sheets

(56) References Cited

U.S. PATENT DOCUMENTS

| | | |
|---|---|---|
| 2007/0071347 A1 | 3/2007 | Li et al. |
| 2007/0133901 A1 | 6/2007 | Aiso |
| 2007/0237421 A1* | 10/2007 | Luo et al. ................ 382/284 |
| 2011/0234847 A1 | 9/2011 | Bigioi et al. |
| 2011/0235912 A1 | 9/2011 | Bigioi et al. |

OTHER PUBLICATIONS

Patent Abstracts of Japan, publication No. 2007-087234, publication date: Apr. 5, 2007, for: Image Processing Method and Apparatus, and Program.

Paul Viola and Michael Jones: Robust Real-Time Object Detection, International Journal of Computer Vision, Kluwer Academic Publishers, vol. 57, No. 2, 2004, pp. 137-154.

Paul Viola and Michael Jones: Rapid Object Detection Using a Boosted Cascade of Simple Features, IEEE, 2001, pp. I-511-I-518.

Final Rejection, dated Nov. 30, 2012, for U.S. Appl. No. 13/034,707, filed Feb. 25, 2011.

Notice of Allowance, dated Apr. 10, 2013, for U.S. Appl. No. 13/034,707, filed Feb. 25, 2011.

Notice of Allowance, dated Jul. 11, 2013, for U.S. Appl. No. 13/103,077, filed May 8, 2011.

* cited by examiner

IMAGE PROCESSING METHOD AND APPARATUS

PRIORITY

This application is a Continuation of U.S. patent application Ser. No. 13/103,077, filed May 8, 2011; which is a Continuation of U.S. patent application Ser. No. 13/034,707, filed Feb. 25, 2011; which is a Continuation of U.S. patent application Ser. No. 11/752,925, filed May 24, 2007, now U.S. Pat. No. 7,916,971; which is hereby incorporated by reference.

BACKGROUND

The present invention relates to an image processing method and apparatus. One of the most common reasons for an acquired digital photograph to be discarded or spoiled is because one or more of the facial regions in the photograph suffer from photographic defects other than red-eye defects, even though red eye defects can be common in cameras not operating with the advantages of the techniques described, e.g., at U.S. Pat. No. 6,407,777, and at US published applications nos. 2005/0140801, 2005/0041121, 2006/0093212, and 2006/0204054, which are assigned to the same assignee and hereby incorporated by reference. Common examples occur when people move or shake their head; when someone closes their eyes or blinks or someone yawns. Where there are several faces in a photograph, it is sufficient for one face to be "defective" for the whole shot to be spoiled. Although digital cameras allow users to quickly shoot several pictures of the same scene, typically, such cameras do not provide warnings of facial errors, nor provide a way to correct for such errors without repeating the composition stages (i.e. getting everyone together again in a group) of taking the photograph and re-shooting the scene. This type of problem is particularly difficult with children who are often photographed in unusual spontaneous poses which cannot be duplicated. When such a shot is spoiled because the child moved their head at the moment of acquisition, it is very disappointing for the photographer.

U.S. Pat. No. 6,301,440, which is incorporated by reference, discloses an image acquisition device wherein the instant of exposure is controlled by image content. When a trigger is activated, the image proposed by the user is analysed and imaging parameters are altered to obtain optimum image quality before the device proceeds to take the image. For example, the device could postpone acquisition of the image until every person in the image is smiling.

SUMMARY OF THE INVENTION

An image processing method is provided including acquiring a main image of a scene. One or more facial regions are determined in the main image. The one or more main image facial regions are analyzed for defects and one or more are determined to be defective. A sequence of relatively low resolution images nominally of the scene are acquired. One or more sets of low resolution facial regions in the sequence are analyzed to determine one or more that correspond to a defective main image facial region. At least a portion of the defective main image facial region is corrected with image information from one or more corresponding low resolution facial regions not including a same defect as said portion of said defective main image facial region.

The sequence of low resolution images may be specifically acquired for a time period not including a time for acquiring the main image. The method may also include combining defect-free low resolution facial regions into a combined image, and correcting at least the portion of the defective main image facial region with image information from the combined image.

Another image processing method is provided that includes acquiring a main image of a scene. One or more facial regions in the main image are determined, and analyzed to determine if any are defective. A sequence of relatively low resolution images is acquired nominally of the scene for a time period not including a time for acquiring the main image. One or more sets of low resolution facial regions are determined in the sequence of low resolution images. The sets of facial regions are analyzed to determine if any facial regions of a set corresponding to a defective facial region of the main image include a defect. Defect free facial regions of the corresponding set are combined to provide a high quality defect free facial region. At least a portion of any defective facial regions of said main image are corrected with image information from a corresponding high quality defect free facial region.

The time period may include one or more of a time period preceding or a time period following the time for acquiring the main image. The correcting may include applying a model including multiple vertices defining a periphery of a facial region to each high quality defect-free facial region and a corresponding defective facial region. Pixels may be mapped of the high quality defect-free facial region to the defective facial region according to the correspondence of vertices for the respective regions. The model may include an Active Appearance Model (AAM).

The main image may be acquired at an exposure level different to the exposure level of the low resolution images. The correcting may include mapping luminance levels of the high quality defect free facial region to luminance levels of the defective facial region.

Sets of low resolution facial regions from the sequence of low resolution images may be stored in an image header file of the main image.

The method may include displaying the main image and/or corrected image, and selected actions may be user-initiated.

The analyzing of the sets may include, prior to the combining in the second method, removing facial regions including faces exceeding an average size of faces in a set of facial regions by a threshold amount from said set of facial regions, and/or removing facial regions including faces with an orientation outside an average orientation of faces in a set of facial regions by a threshold amount from said set of facial regions.

The analyzing of sets may include the following:
applying an Active Appearance Model (AAM) to each face of a set of facial regions;
analyzing AAM parameters for each face of the set of facial regions to provide an indication of facial expression; and
prior to the combining in the second method, removing faces having a defective expression from the set of facial regions.

The analyzing of sets may include the following:
applying an Active Appearance Model (AAM) to each face of a set of facial regions;
analysing AAM parameters for each face of the set of facial regions to provide an indication of facial orientation; and
prior to said combining in the second method, removing faces having an undesirable orientation from said set of facial regions.

The analyzing of facial regions may include applying an Active Appearance Model (AAM) to each facial region, and analyzing AAM parameters for each facial region to provide an indication of facial expression, and/or analyzing each facial region for contrast, sharpness, texture, luminance levels or skin color or combinations thereof, and/or analyzing each facial region to determine if an eye of the facial region is closed, if a mouth of the facial region is open and/or if a mouth of the facial region is smiling.

The method may be such that the correcting, and the combining in the second method, only occur when the set of facial regions exceeds a given number. The method may also include resizing and aligning faces of the set of facial regions, and the aligning may be performed according to cardinal points of faces of the set of facial regions.

The correcting may include blending and/or infilling a corrected region of the main image with the remainder of the main image.

BRIEF DESCRIPTION OF THE DRAWINGS

Embodiments will now be described, by way of example, with reference to the accompanying drawings, in which.

DETAILED DESCRIPTION OF THE PREFERRED EMBODIMENTS

Certain embodiments can be implemented with a digital camera which incorporates (i) a face tracker operative on a preview image stream; (ii) a super-resolution processing module configured to create a higher resolution image from a composite of several low-resolution images; and (iii) a facial region quality analysis module for determining the quality of facial regions.

Preferably, super-resolution is applied to preview facial regions extracted during face tracking.

The embodiments enable the correction of errors or flaws in the facial regions of an acquired image within a digital camera using preview image data and employing super-resolution techniques.

Figure 1:
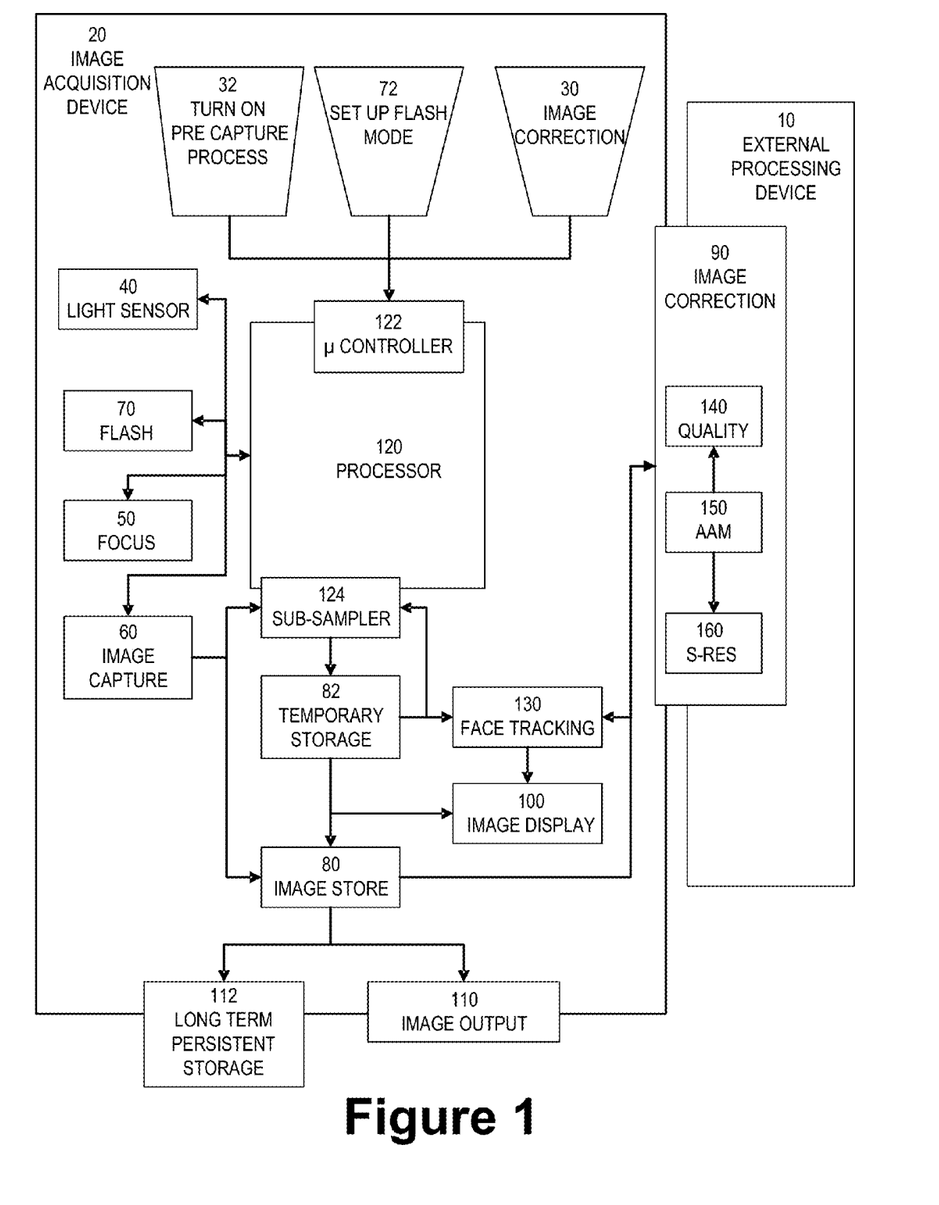
FIG. 1 is a block diagram of an image processing apparatus operating in accordance with an embodiment of the present invention.

FIG. 1 is a block diagram of an image acquisition device 20, which in the present embodiment is a portable digital camera, operating in accordance with certain embodiments. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display is controlled by a microcontroller 122.

In operation, the processor 120, in response to a user input at 122, such as half pressing a shutter button (pre-capture mode 32), initiates and controls the digital photographic process. Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button.

The image capture device 60 digitally records the image in colour. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such a dynamic random access memory or a non-volatile memory. The camera is equipped with a display 100, such as an LCD, both for displaying preview images and displaying a user interface for camera control software.

In the case of preview images which are generated in the pre-capture mode 32 with the shutter button half-pressed, the display 100 can assist the user in composing the image, as well as being used to determine focus and exposure. Temporary storage 82 is used to store one or plurality of the stream of preview images and can be part of the image store 80 or a separate component. The preview image is usually generated by the image capture device 60. For speed and memory efficiency reasons, preview images usually have a lower pixel resolution than the main image taken when the shutter button is fully depressed, and are generated by sub-sampling a raw captured image using software 124 which can be part of the general processor 120 or dedicated hardware or combination thereof.

In the present embodiment, a face detection and tracking module 130 such as described in U.S. application Ser. No. 11/464,083, filed Aug. 11, 2006, which is hereby incorporated by reference, is operably connected to the sub-sampler 124 to control the sub-sampled resolution of the preview images in accordance with the requirements of the face detection and tracking module. Preview images stored in temporary storage 82 are available to the module 130 which records the locations of faces tracked and detected in the preview image stream. In one embodiment, the module 130 is operably connected to the display 100 so that boundaries of detected and tracked face regions can be superimposed on the display around the faces during preview.

In the embodiment of FIG. 1, the face tracking module 130 is arranged to extract and store tracked facial regions at relatively low resolution in a memory buffer such as memory 82 and possibly for storage as meta-data in an acquired image header stored in memory 80. Where multiple face regions are tracked, a buffer is established for each tracked face region. These buffers are of finite size (10-20 extracted face regions in a preferred embodiment) and generally operate on a first-in-first-out (FIFO) basis.

According to the preferred embodiment, the device 20 further comprises an image correction module 90. Where the module 90 is arranged for off-line correction of acquired images in an external processing device 10, such as a desktop computer, a colour printer or a photo kiosk, face regions detected and/or tracked in preview images are preferably stored as meta-data within the image header. However, where the module 90 is implemented within the camera 20, it can have direct access to the buffer 82 where preview images and/or face region information is stored.

In this embodiment, the module 90 receives the captured high resolution digital image from the store 80 and analyzes it to detect defects. The analysis is performed as described in the embodiments to follow. If defects are found, the module can modify the image to remove the defect. The modified image may be either displayed on image display 100, saved on a persistent storage 112 which can be internal or a removable storage such as CF card, SD card or the like, or downloaded to another device via image output means 110 which can be tethered or wireless. The module 90 can be brought into operation either automatically each time an image is captured, or upon user demand via input 30. Although illustrated as a separate item, where the module 90 is part of the camera, it may be implemented by suitable software on the processor 120.

The main components of the image correction module include a quality module 140 which is arranged to analyse face regions from either low or high resolution images to determine if these include face defects. A super-resolution module 160 is arranged to combine multiple low-resolution face regions of the same subject generally with the same pose and a desirable facial expression to provide a high quality face region for use in the correction process. In the present embodiment, an active appearance model (AAM) module 150 produces AAM parameters for face regions again from either low or high resolution images.

AAM modules are well known and a suitable module for the present embodiment is disclosed in "Fast and Reliable Active Appearance Model Search for 3-D Face Tracking", F Dornaika and J Ahlberg, IEEE Transactions on Systems, Man, and Cybernetics-Part B: Cybernetics, Vol. 34, No. 4, pg 1838-1853, August 2004, although other models based on the original paper by T F Cootes et al "Active Appearance Models" Proc. European Conf. Computer Vision, 1998, pp 484-498 could also be employed.

The AAM module 150 can preferably cooperate with the quality module 140 to provide pose and/or expression indicators to allow for selection of images in the analysis and optionally in the correction process described below. Also, the AAM module 150 can preferably cooperate with the super-resolution module 160 to provide pose indicators to allow for selection of images in the correction process, again described in more detail below.

Figure 2:
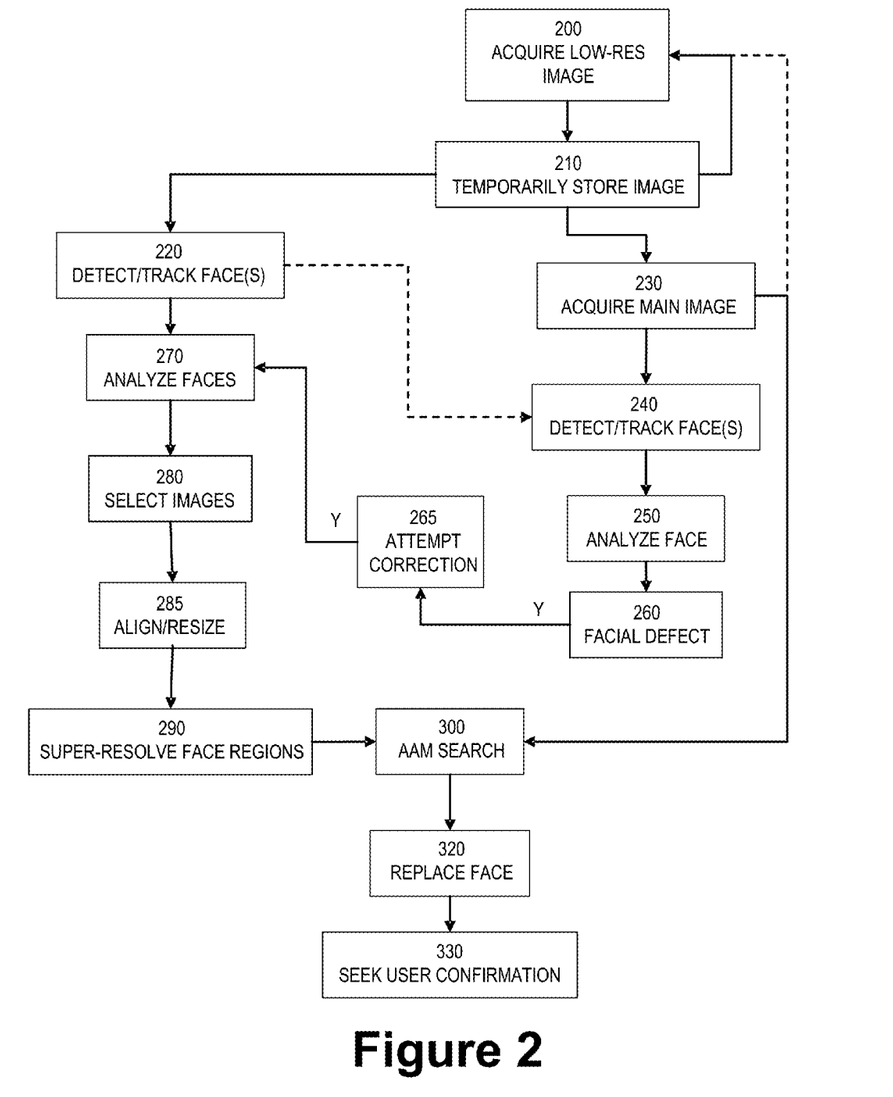
FIG. 2 is a flow diagram of an image processing method according to a preferred embodiment of the present invention.

Referring now to FIG. 2, which illustrates an exemplary processing flow for certain embodiments, when a main image is acquired, step 230, the location and size of any detected/tracked face region(s) in the main acquired image (high resolution) will be known by the module 90 from the module 130. Face detection can either be applied directly on the acquired image and/or information for face regions previously detected and/or tracked in the preview stream can be used for face detection in the main image (indicated by the dashed line extending from step 220). At step 250, the facial region quality analysis module 140 extracts and analyzes face regions tracked/detected at step 240 in the main image to determine the quality of the acquired face regions. For example, the module 140 can apply a preliminary analysis to measure the overall contrast, sharpness and/or texture of detected face region(s). This can indicate if the entire face region was blurred due to motion of the subject at the instant of acquisition. If a facial region is not sufficiently well defined then it is marked as a blur defect. In additional or alternatively, another stage of analysis can focus on the eye region of the face(s) to determine if one, or both eyes were fully or partially closed at the instant of acquisition and the face region is categorized accordingly. As mentioned previously, if AAM analysis is performed on the image, then the AAM parameters can be used to indicate whether a subject's eyes are open or not. It should be noted that in the above analyses, the module 90 detects blink or blur due to localized movement of the subject as opposed to global image blur.

Another or alternative stage of analysis focuses on the mouth region and determines if the mouth is opened in a yawn or indeed not smiling; again the face region is categorized accordingly. As mentioned previously, if AAM analysis is performed on the image, then the AAM parameters can be used to indicate the state of a subject's mouth.

Other exemplary tests might include luminance levels, skin colour and texture histograms, abrupt facial expressions (smiling, frowning) which may cause significant variations in facial features (mouth shape, furrows in brow). Specialized tests can be implemented as additional or alternative image analysis filters, for example, a Hough transform filter could be used to detect parallel lines in a face region above the eyes indicating a "furrowed brow". Other image analysis techniques such as those known in the art and as disclosed in U.S. Pat. No. 6,301,440 can also be employed to categorise the face region(s) of the main image.

After this analysis, it is decided (for each face region) if any of these defects occurred, step 260, and the camera or external processing device user can be offered the option of repairing the defect based on the buffered (low resolution) face region data, step 265.

When the repair option is actuated by the user, each of the low-resolution face regions is first analyzed by the face region quality analyzer, step 270. As this analysis is operative on lower resolution images acquired and stored at steps 200/210, the analysis may vary from the analysis of face regions in the main acquired image at step 250. Nevertheless the analysis steps are similar in that each low-resolution face region is analyzed to determine if it suffers from image defects in which case it should not be selected at step 280 to reconstruct the defective face region(s) in the main image. After this analysis and selection, if there are not enough "good" face regions corresponding to a defective face region available from the stream of low-resolution images, an indication is passed to the user that image repair is not viable. Where there are enough "good" face regions, these are passed on for resizing and alignment, step 285.

This step re-sizes each face region and performs some local alignment of cardinal face points to correct for variations in pose and to ensure that each of the low-resolution face regions overlap one another as uniformly as is practical for later processing.

It should also be noted that as these image regions were captured in sequence and over a relatively short duration, it is expected that they are of approximately the same size and orientation. Thus, image alignment can be achieved using cardinal face points, in particular those relating to the eyes, mouth, and lower face (chin region) which is normally delineated by a distinct boundary edge, and the upper face which is normally delineated by a distinctive hairline boundary. Some slight scaling and morphing of extracted face regions may be used to achieve reasonable alignment, however a very precise alignment of these images is not desirable as it would undermine the super-resolution techniques which enable a higher resolution image to be determined from several low-resolution images.

It should be noted that the low-resolution images captured and stored at steps 200/210 can be captured either from a time period before capturing the main image or from a period following capture of the main image (indicated by the dashed line extending from step 230). For example, it may be possible to capture suitable defect free low resolution images in a period immediately after a subject has stopped moving/blinking etc. following capture of the main image.

This set of selected defect free face regions is next passed to a super-resolution module 160 which combines them using known super-resolution methods to yield a high resolution face region which is compatible with a corresponding region of the main acquired image.

Now the system has available to it, a high quality defect-free combination face region and a high resolution main image with a generally corresponding defective face region.

Figure 3:
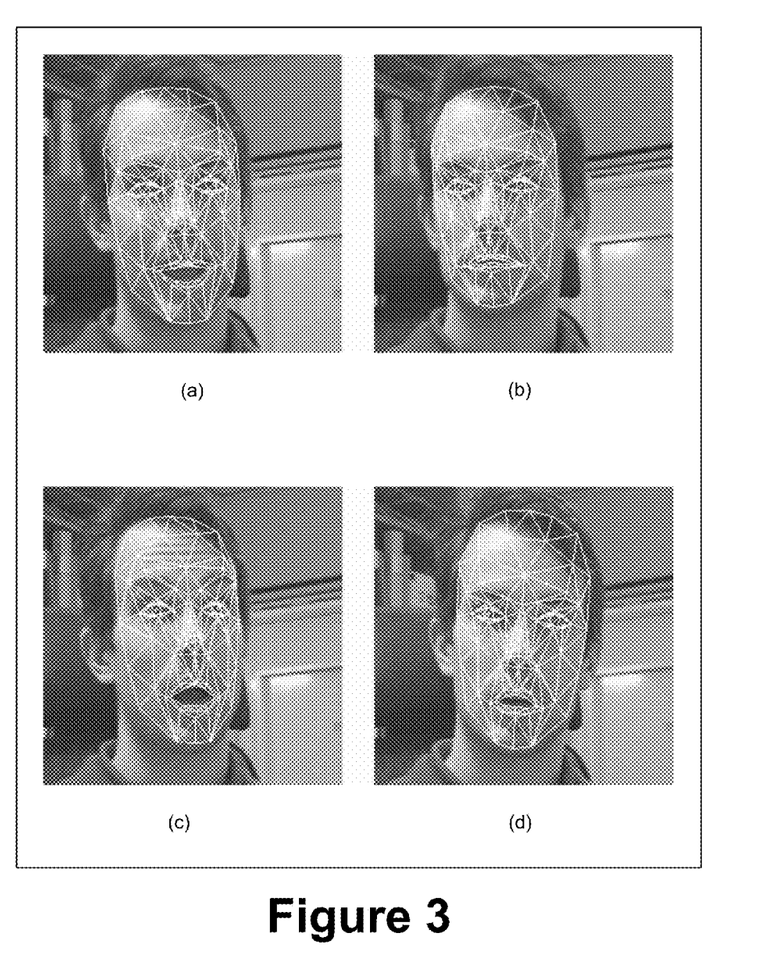
FIGS. 3 and 4 show exemplary sets of images to which an active appearance model has been applied.

If this has not already been performed for quality analysis, the defective face region(s) as well as the corresponding high quality defect-free face region are subjected to AAM analysis, step 300. Referring now to FIG. 3(a) to (d), which illustrates some images including face regions which have been processed by the AAM module 150. In this case, the model represented by the wire frame superimposed on the face is tuned for a generally forward facing and generally upright face, although separate models can be deployed for use with inclined faces or faces in profile. Once the model has been applied, it returns a set of coordinates for the vertices of the wire frame; as well as texture parameters for each of the triangular elements defined by adjacent vertices. The relative coordinates of the vertices as well as the texture parameters can in turn provide indicators linked to the expression and inclination of the face which can be used in quality analysis as mentioned above.

It will therefore be seen that the AAM module 150 can also be used in the facial region analysis steps 250/270 to provide in indicator of whether a mouth or eyes are open i.e. smiling and not blinking; and also to help determine in steps 285/290 implemented by the super-resolution module 160 whether facial regions are similarly aligned or inclined for selection before super-resolution.

So, using FIG. 3(a) as an example of a facial region produced by super-resolution of low resolution images, it is observed that the set of vertices comprising the periphery of the AAM model define a region which can be mapped on to corresponding set of peripheral vertices of FIG. 3(b) to FIG. 3(d) where these images have been classified and confirmed by the user as defective facial regions and candidates for correction.

Figure 4:
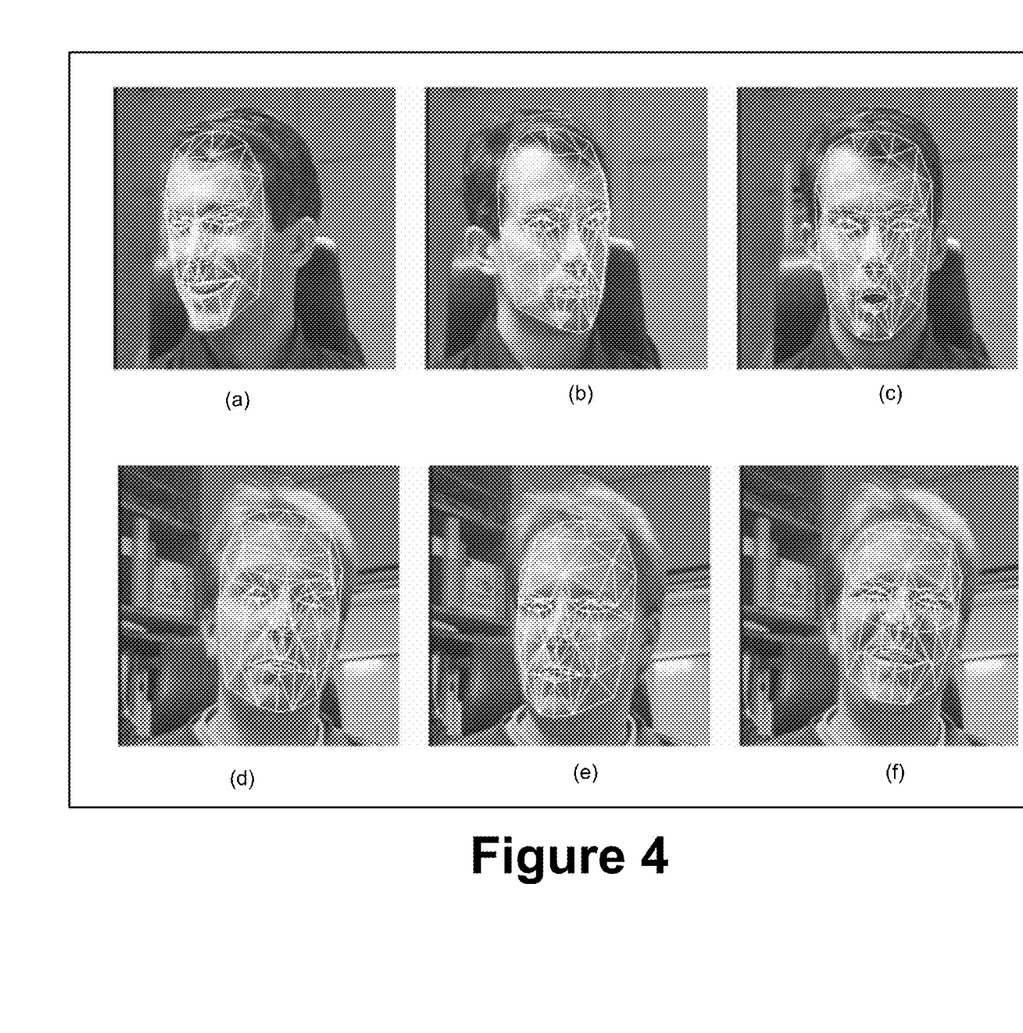

In relation to FIG. 4, the model parameters for FIG. 4(a) or 4(b) which might represent super-resolved defect free face regions could indicate that the left-right orientation of these face regions would not make them suitable candidates for correcting the face region of FIG. 4(c). Similarly, the face region of FIG. 4(f) could be a more suitable candidate than the face region of FIG. 4(e) for correcting the face region of FIG. 4(d).

In any case, if the super-resolved face region is deemed to be compatible with the defective face region, information from the super-resolved face region can be pasted onto the main image by any suitable technique to correct the face region of the main image, step 320. The corrected image can be viewed and depending on the nature of the mapping, it can be adjusted by the user, before being finally accepted or rejected, step 330. So for example, where dithering around the periphery of the corrected face region is used as part of the correction process, step 320, the degree of dithering can be adjusted. Similarly, luminance levels or texture parameters in the corrected regions can be manually adjusted by the user, or indeed any parameter of the corrected region and the mapping process can be manually adjusted prior to final approval or rejection by the user.

While AAM provides one approach to determine the outside boundary of a facial region, other well-known image processing techniques such as edge detection, region growing and skin color analysis may be used in addition or as alternatives to AAM. However, these may not have the advantage of also being useful in analysing a face region for defects and/or for pose information. Other techniques which can prove useful include applying foreground/background separation to either the low-resolution images or the main image prior to running face detection to reduce overall processing time by only analysing foreground regions and particularly foreground skin segments. Local colour segmentation applied across the boundary of a foreground/background contour can assist in further refining the boundary of a facial region.

Once the user is satisfied with the placement of the reconstructed face region they may choose to merge it with the main image; alternatively, if they are not happy they can cancel the reconstruction process. These actions are typically selected through buttons on the camera user interface where the correction module is implemented on the acquisition device 20.

As practical examples let us consider an example of the system used to correct an eye defect. An example may be used of a defect where one eye is shut in the main image frame due to the subject "blinking" during the acquisition. Immediately after the main image acquisition the user is prompted to determine if they wish to correct this defect. If they confirm this, then the camera begins by analyzing a set of face regions stored from preview images acquired immediately prior to the main image acquisition. It is assumed that a set of, say, 20 images was saved from the one second period immediately prior to image acquisition. As the defect was a blinking eye, the initial testing determines that the last, say, 10 of these preview images are not useful. However the previous 10 images are determined to be suitable. Additional testing of these images might include the determination of facial pose, eliminating images where the facial pose varies more than 5% from the averaged pose across all previews; a determination of the size of the facial region, eliminating images where the averaged size varies more than 25% from the averaged size across all images. The reason the threshold is higher for the latter test is that it is easier to rescale face regions than to correct for pose variations.

In variations of the above described embodiment, the regions that are combined may include portions of the background region surrounding the main face region. This is particularly important where the defect to be corrected in the main acquired image is due to face motion during image exposure. This will lead to a face region with a poorly defined outer boundary in the main image and the super-resolution image which is superimposed upon it typically incorporates portions of the background for properly correcting this face motion defect. A determination of whether to include background regions for face reconstruction can be made by the user, or may be determined automatically after a defect analysis is performed on the main acquired image. In the latter case, where the defect comprises blurring due to face motion, then background regions will normally be included in the super-resolution reconstruction process. In an alternative embodiment, a reconstructed background can be created using either (i) region infilling techniques for a background region of relatively homogeneous colour and texture characteristics, or (ii) directly from the preview image stream using image alignment and super-resolution techniques. In the latter case the reconstructed background is merged into a gap in the main image background created by the separation of foreground from background; the reconstructed face region is next merged into the separated foreground region, specifically into the facial region of the foreground and finally the foreground is re-integrated with the enhanced background region.

After applying super-resolution methods to create a higher resolution face region from multiple low-resolution preview images, some additional scaling and alignment operations are normally involved. Furthermore, some blending, infilling and morphological operations may be used in order to ensure a smooth transition between the newly constructed super-resolution face region and the background of the main acquired image. This is particularly the case where the defect to be corrected is motion of the face during image exposure. In the case of motion defects it may also be desirable to reconstruct portions of the image background prior to integration of the reconstructed face region into the main image.

It is also be-desirable to match the overall luminance levels of the new face region with that of the old face region, and this is best achieved through a matching of the skin colour between the old region and the newly constructed one. Preview images are acquired under fixed camera settings and can be over/under exposed. This may not be fully compensated for during the super-resolution process and may involve additional image processing operations.

While the above described embodiments have been directed to replacing face regions within an image, it will be seen that AAM can be used to model any type of feature of an image. So in certain embodiments, the patches to be used for super-resolution reconstruction may be sub-regions within a face region. For example, it may be desired to reconstruct only a segment of the face regions, such as an eye or mouth region, rather than the entire face region. In such cases, a determination of the precise boundary of the sub-region is of less importance as the sub-region will be merged into a surrounding region of substantially similar colour and texture (i.e. skin colour and texture). Thus, it is sufficient to center the eye regions to be combined or to align the corners of the mouth regions and to rely on blending the surrounding skin coloured areas into the main image.

In one or more of the above embodiments, separate face regions may be individually tracked (see also U.S. application Ser. No. 11/464,083, which is hereby incorporated by reference). Regions may be tracked from frame-to-frame. Preview or post-view face regions can be extracted, analyzed and aligned with each other and with the face region in the main or final acquired image. In addition, in techniques according to certain embodiments, faces may be tracked between frames in order to find and associate smaller details between previews or post-views on the face. For example, a left eye from Joe's face in preview N may be associated with a left eye from Joe's face in preview N+1. These may be used together to form one or more enhanced quality images of Joe's eye. This is advantageous because small features (an eye, a mouth, a nose, an eye component such as an eye lid or eye brow, or a pupil or iris, or an ear, chin, beard, mustache, forehead, hairstyle, etc. are not as easily traceable between frames as larger features and their absolute or relative positional shifts between frames tend to be more substantial relative to their size.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections themselves, are hereby incorporated by reference into the detailed description of the preferred embodiments as disclosing alternative embodiments and components. The following are also incorporated by reference for this purpose: U.S. patent applications Nos. 60/829,127, 60/804,546, 60/821,165 Ser. Nos. 11/554,539, 11/464,083, 11/027,001, 10/842,244, 11/024,046, 11/233,513, 11/460,218, 11/573,713, 11/319,766, 11/464,083, 11/744,020 and Ser. No. 11/460,218, and U.S. published application no. 2006/0285754.

The invention claimed is:

1. An image processing method comprising:
   using a processor-based image acquisition device to acquire a main image of a scene and two or more further images approximately of a same scene within a time period;
   wherein said time period begins proximately before said acquiring of said main image and ends proximately after said acquiring of said main image;
   using one or more computing devices to perform the steps of:
      determining that a particular object in said main image has a defect;
      identifying two or more defect free objects, from the two or more further images, that correspond to the particular object;
      creating a corrective object that corresponds to the particular object by combining together said two or more defect free objects;
      performing a comparison between said particular object and said corrective object; and
      determining whether to initiate a further action based on said comparison.

2. The method of claim 1 wherein said acquiring of said two or more further images is performed within the time period proximately before said acquiring of said main image.

3. The method of claim 1 wherein at least one of determining that the particular object in said main image has the defect and identifying two or more defect free objects comprises using a model that defines a plurality of vertices to determine a periphery of the particular object or the two or more defect free objects, respectively.

4. The method of claim 3 wherein said model comprises an Active Appearance Model (AAM).

5. The method of claim 1 wherein said main image is acquired at a different resolution than a resolution of said one or more further images.

6. The method of claim 5, wherein a resolution of said main image is higher than the resolution of said one or more further images, and wherein creating the corrective object comprises creating said corrective object having a resolution that is higher than a resolution of said two or more defect free objects.

7. The method of claim 1 further comprising performing resizing or aligning of at least one of said two or more defect free objects to be compatible with said particular object.

8. An image acquisition and processing apparatus, comprising:
   a lens and image sensor for acquiring a main image of a scene and two or more further images approximately of a same scene within a time period, wherein said time period begins proximately before said acquiring of said main image and ends proximately after said acquiring of said main image;
   a processor; and
   a memory having code embedded therein for c au sing the processor to perform an image processing method that comprises:
      determining that a particular object in said main image has a defect;

identifying two or more defect free objects, from the two or more further images, that correspond to the particular object;

creating a corrective object that corresponds to the particular object by combining together said two or more defect free objects;

performing a comparison between said particular object and said corrective object; and determining whether to initiate a further action based on said comparison.

9. The apparatus of claim 8, wherein said acquiring of said two or more further images is performed within the time period proximately before said acquiring of said main image.

10. The apparatus of claim 8, wherein at least one of determining that the particular object in said main image has the defect and identifying two or more defect free objects comprises using a model that defines a plurality of vertices to determine a periphery of the particular object or the two or more defect free objects, respectively.

11. The apparatus of claim 10, wherein said model comprises an Active Appearance Model (AAM).

12. The apparatus of claim 8, wherein said main image is acquired at a different resolution.

13. The apparatus of claim 12, wherein a resolution of said main image is higher than the resolution of said one or more further images, and wherein creating the corrective object comprises creating said corrective object having a resolution that is higher than a resolution of said two or more defect free objects.

14. The apparatus of claim 8, the processor further performing resizing or aligning of at least one of said two or more defect free objects to be compatible with said particular object.

15. One or more non-transitory, processor-readable media having code embedded therein for causing a processor to control an image acquisition and processing apparatus to perform an image acquisition and processing method that comprises:

acquiring a main image and two or more further images within a time period, wherein the time period begins proximately before said acquiring of said main image and ends proximately after said acquiring of said main image;

determining that a particular object in said main image has a defect;

identifying two or more defect free objects, from the two or more further images, that correspond to the particular object;

creating a corrective object that corresponds to the particular object by combining together said two or more defect free objects;

performing a comparison between said particular object and said corrective object; and determining whether to initiate a further action based on said comparison.

16. The non-transitory, processor-readable media of claim 15, wherein said acquiring of said two or more further images is performed within the time period proximately before said acquiring of said main image.

17. The non-transitory, processor-readable media of claim 15, wherein at least one of determining that the particular object in said main image has the defect and identifying two or more defect free objects comprises using a model that defines a plurality of vertices to determine a periphery of the particular object or the two or more defect free objects, respectively.

18. The non-transitory, processor-readable media of claim 17, wherein said model comprises an Active Appearance Model (AAM).

19. The non-transitory, processor-readable media of claim 15, wherein said main image is acquired at a different resolution than a resolution of said one or more further images.

20. The non-transitory, processor-readable media of claim 19, wherein a resolution of said main image is higher than a resolution of said one or more further images, and wherein creating the corrective object comprises creating said corrective object having a resolution that is higher than a resolution of said two or more defect free objects.

21. The non-transitory, processor-readable media of claim 15, the code further causing the processor to perform resizing and aligning of at least one of said two or more defect free objects to be compatible with said particular object.

22. The method of claim 1, wherein performing the comparison comprises performing the comparison for orientation compatibility between said particular object and said corrective object.

23. The apparatus of claim 8, wherein performing the comparison comprises performing the comparison for orientation compatibility between said particular object and said corrective object.

24. The non-transitory, processor-readable media of claim 15, wherein performing the comparison comprises performing the comparison for orientation compatibility between said particular object and said corrective object.

25. The method of claim 1, wherein the one or more computing devices comprise the processor-based image acquisition device.

26. The method of claim 1, wherein the particular object comprises a face or a portion of a face.

27. The apparatus of claim 8, wherein the particular object comprises a face or a portion of a face.

28. The non-transitory, processor-readable media of claim 15, wherein the particular object comprises a face or a portion of a face.

* * * * *